(12) United States Patent
Zmener

(10) Patent No.: US 9,407,596 B2
(45) Date of Patent: Aug. 2, 2016

(54) INTERACTIVE SPLITTING OF ENTRIES IN SOCIAL COLLABORATION ENVIRONMENTS

(71) Applicant: International Business Machines Corporation, Armonk, NY (US)

(72) Inventor: Sebastian M. Zmener, Olivos (AR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 261 days.

(21) Appl. No.: 14/084,958

(22) Filed: Nov. 20, 2013

(65) Prior Publication Data

US 2015/0142894 A1    May 21, 2015

(51) Int. Cl.
*H04L 12/58* (2006.01)
*G06F 3/0481* (2013.01)
*G06F 17/27* (2006.01)
*G06Q 10/10* (2012.01)
*G06Q 50/00* (2012.01)

(52) U.S. Cl.
CPC ............ *H04L 51/32* (2013.01); *G06F 3/04812* (2013.01); *G06F 17/2775* (2013.01); *G06Q 10/10* (2013.01); *G06Q 50/01* (2013.01); *H04L 51/063* (2013.01)

(58) Field of Classification Search
CPC ....................................................... G06F 3/048
See application file for complete search history.

(56) References Cited

U.S. PATENT DOCUMENTS 8,719,703 B2 *  5/2014  Bier .................. G06F 17/24
715/255
2002/0073125 A1 *  6/2002  Bier .................. G06F 17/24
715/255
2005/0131916 A1 *  6/2005  Banatwala ........ G06F 17/30595
2010/0095198 A1 *  4/2010  Bultrowicz ............ G06Q 10/00
715/234
2010/0235763 A1    9/2010  Massand
2011/0055723 A1    3/2011  Lightstone et al.
2012/0260195 A1   10/2012  Hon et al.
2014/0053068 A1 *  2/2014  Devi ...................... G06F 17/241
715/256

FOREIGN PATENT DOCUMENTS

CN       104657406 A     5/2015
WO    2010124302 A2    10/2010
WO    2012129336 A1     9/2012

OTHER PUBLICATIONS

"Collaboration Integration Guidelines", Version 2.0.0.1, dated Nov. 22, 2012, FusionGPS: Guidelines: Applications Collaboration Integration Guidelines, <oracle.com/webfolder/ux/applications/fusiongps/guidelines/content/guidelines/collabintegration/index.htm>.

* cited by examiner

*Primary Examiner* — Shirley Zhang
(74) *Attorney, Agent, or Firm* — Ronald Kaschak; Arnold B. Bangali

(57) ABSTRACT

A method for interactive splitting of a post of a social collaborative environment is provided. The method comprises, in response to a selection of a portion of the post, splitting the post at a location of at least one of a boundary of the selection or within the selection into a first segment and a second segment. A tool is utilized to split the post at the location of at least one of the boundary of the selection or within the selection into the first segment and the second segment. An input box configured to receive a response to the post is presented in an interactive post editing interface of the post, wherein the presentation of the input box occurs in a space defined between the first segment and the second segment. The response can be inserted in the space defined between the first segment and the second segment.

17 Claims, 10 Drawing Sheets

HOST PROGRAM  108

HOST WEB PAGE MODULE  200

INTERACTIVE POST SPLIT MODULE  210

15 replies Last Post - Feb 29 by MARY JONES

Susan James
4 posts

310

What does change at Company mean to a technical leader?
Feb 2 | Tags: change_management, ocm, organizational_change Technical leaders across Company are continuously experiencing, managing and driving changes..and I am sure that these changes come in many forms. In you role you may be directly responsible for, or have to adopt, process changes, structure or job changes, new skills and more - all independently or in tandem with technology initiatives / changes.

As we prepare for the upcoming series of TLE sessions on the topic of Organizational Change Management, we would like to learn more about what change means to you, as an Company technical leader.
What kinds of organizational change do you most frequently encounter? ✂ ⇨ — 312  ②
What aspects of change are the most challenging for you in your role? Why?
What has contributed to your success when change programs have gone well? Why?
What skills would you like to know more about / acquire to help you lead and manage change more *successfully* in the *future*?

Reply | Split and Reply

HOST PROGRAM 108

HOST WEB PAGE MODULE 200

INTERACTIVE POST SPLIT MODULE 210

Susan James
4 posts
310

What does change at Company mean to a technical leader?
Feb 2 | Tags: change_management, ocm, organizational_change
Technical leaders across Company are continuously experiencing, managing and driving changes..and I am sure that these changes come in many forms. In you role you may be directly responsible for, or have to adopt, process changes, structure or job changes, new skills and more - all independently or in tandem with technology initiatives / changes.
As we prepare for the upcoming series of TLE sessions on the topic of Organizational Change Management, we would like to learn more about what change means to you, as an Company technical leader:

What kinds of organizational change do you most frequently encounter?
What aspects of change are the most challenging for you in your role? Why?
What has contributed to your success when change programs have gone well? Why?
What skills would you like to know more about / acquire to help you lead and manage change more successfully in the future?

Reply | Split and Reply | Split view ～ 410

John Smith
1 posts
310

Feb 8  Re: What does change at Company mean to a technical leader?
In response to Kinthi Sturtevant
What kinds of organizational change do you most frequently encounter? ⬇ 312 ①

Feb 8  Taking on customer employees into Company as part of SO deals.
What aspects of change are the most challenging for you in your role? Why?
To get a mind set change for the ex customer employees from being part of the customer organization to become part of the Company delivery engine especially where they continue supporting customer applications on the customer site.
What has contributed to your success when change programs have gone well? Why?

Feb 8  Moving employees from the customer site to Company premises and continued change management activities like surveys and support thereafter.
What skills would you like to know more about / acquire to help you lead and manage change more successfully in the future?

312 ②  Get basic change management skills to allow the program managers to ask for the correct change management activities at the optimum time as keeping full-time change people onboard is rather costly.

Reply

FIG. 3C

INTERACTIVE SPLITTING OF ENTRIES IN SOCIAL COLLABORATION ENVIRONMENTS

FIELD OF THE INVENTION

The present invention relates generally to collaborative computing systems, and more particularly to interactive splitting of entries in social collaborative environments of one or more collaborative computing systems.

BACKGROUND OF THE INVENTION

The Internet is a global network of computers joined together by gateways of computing networks that handle data transfer and transmission of messages from a protocol of a sending network to a protocol a receiving network. Information travels over the Internet through a variety of languages also referred to as network communication protocols. Instant messaging is a form of communication that travels over the Internet. Instant messaging also offers transmission of information between one or more individuals of collaborative computing systems. For example, in business or personal computing environments, individuals frequently collaborate and share information over the Internet via collaborative messaging tools of collaborative computing systems. Collaborative messaging tools help facilitate collaboration over the Internet by allowing individuals to communicate in real-time with other individuals through social networking websites, mobile devices, and/or other communication devices

SUMMARY

In one embodiment, a computer-implemented method for interactive splitting of a post of a social collaborative environment is provided. The computer-implemented comprises, in response to a selection of a portion of the post, splitting, by one or more processors, the post at a location of at least one of a boundary of the selection or within the selection into a first segment and a second segment. The computer-implemented method further comprises, presenting by the one or more processors, an input box configured to receive a response to the post, wherein the presentation of the input box occurs in a space defined between the first segment and the second segment. The computer-implemented method further comprises inserting, by the one or more processors, the response in the space defined between the first segment and the second segment.

In another embodiment, a computer system is for interactive splitting of a post of a social collaborative environment is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises, in response to a selection of a portion of the post, program instructions to split the post at a location of at least one boundary of the selection or within the selection into a first segment and a second segment. The computer system further comprises program instructions to present an input box configured to receive a response to the post, wherein the presentation of the input box occurs in a space defined between the first segment and the second segment. The computer system further comprises program instructions to insert the response in the space defined between the first segment and the second segment.

In yet another embodiment, a computer program product for interactive splitting of a post of a social collaborative environment is provided. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product comprises, in response to a selection of a portion of the post, program instructions to split the post at a location of at least one of a boundary of the selection or within the selection into a first segment and a second segment. The computer program product further comprises program instructions to present an input box configured to receive a response to the post, wherein the presentation of the input box occurs in a space defined between the first segment and the second segment. The computer program product further comprises program instructions to insert the response in the space defined between the first segment and the second segment.

BRIEF DESCRIPTION OF THE SEVERAL VIEWS OF THE DRAWINGS

Novel characteristics of the invention are set forth in the appended claims. The invention will be best understood by reference to the following detailed description of the invention when read in conjunction with the accompanying Figures, wherein like reference numerals indicate like components, and:

FIGS. 3A-3C are exemplary views of user interface elements added to a user interface of an interactive post splitting program in accordance with embodiments of the present invention.

DETAILED DESCRIPTION

Figure 1:
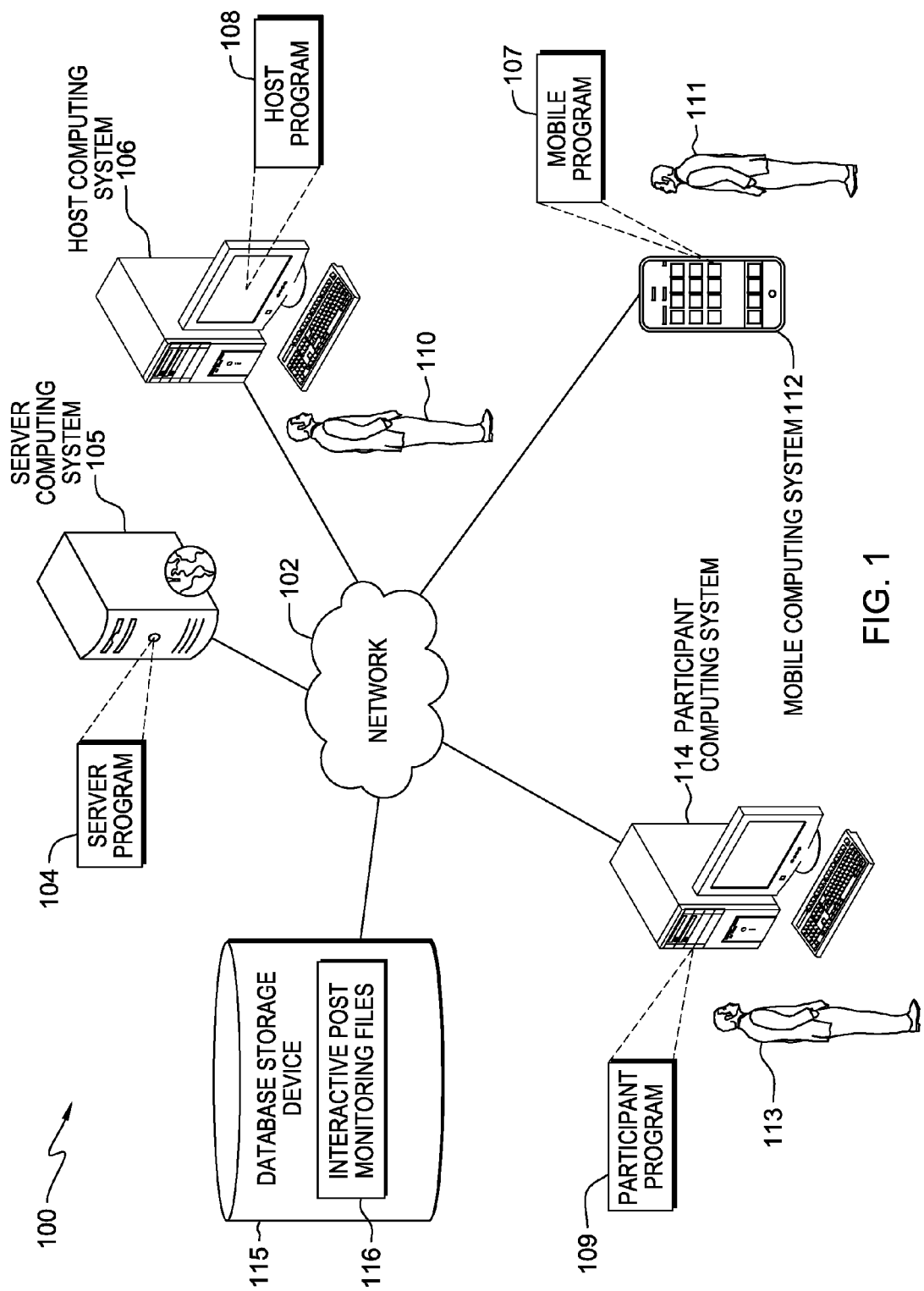
FIG. 1 is a functional diagram of a collaborative communication system for interactive splitting of a post of a social collaborative environment of the collaborative communication system in accordance with embodiments of the present invention.

The present invention will now be described in details with reference to the accompanying Figures. Referring to FIG. 1, collaborative communication system 100 for interactive splitting of a post of a social collaborative environment of collaborative communication system 100 is shown. According to aspects of the present invention, the social collaborative environment can be an enterprise social software program, including, for example, IBM® Notes ®, wherein the social collaborative environment provides a social, or personal business collaboration environment between users of collaborative communication system 100. For example, the social collaborative environment supports collaborative interaction in forum posts, blog entries, or other types of collaborative correspondences between one or more users of collaborative communication system 100.

Consider, for example, an ongoing discussion between professionals of a work team, wherein the ongoing discussion is conducted in a blog or a forum of a social collaborative environment. Certain social collaborative environments can provide a hierarchical relationship between posts and replies to the post of the ongoing discussion between the professionals. However, social collaborative environments do not provide a mechanism that'll allow the professionals of the ongoing discussion to respond to specific paragraphs or portions of the post. For example, suppose that a first colleague of the professional work team analyzes a spreadsheet and leaves the following feedback of the spreadsheet to share with other professional of the work team on a blog post of the social collaborative environment: "I was looking into this cost case and when I checked the development budget, the same is not reflected in the second sheet. Regarding the requests, I think it would be good to claim discount for quantity. I am also thinking that the domain registration can be made by us, thus avoiding this cost. Another thing I would like to propose is to include the effort in hours, and not just the money. Finally, there is an error in a formula (cell N28) that is increasing cost by 10%. How do you think we should make the correction?" A response to feedback by the colleague or second colleague of the professionals of the work team in the social collaborative environment could be: "The second sheet is only a reference. Forget it and focus on the total amount shown in the first sheet. What you say about requests, I believe that they could discount us if we ask for more than ten units, and with regard to registering the domain, I don't believe that they will allow us to not pay for it, because already comes included in the package. I agree with the effort hours. And about the formula, you are forgetting to raise multiplication to the cost of the request less the discount. I'll do some tests by myself and if succeed I send you the corrected file." Assuming that the first colleague of the post replies to the response of the feedback by the second colleague, the first colleague will need to clarify to which of any of the following posted issues or topics he is replying to, for example, ("With regard to . . . ", "About such a thing . . . ", "Your observation on. . . "). Also, consider that a third colleague gives an opinion on the post? As the number of comments of the post grows, it can be difficult to tell what specific portions of the posts in the social collaborative environment are responded to, by any of the first, second or third colleague of the professionals of the work team during the ongoing work discussion.

For example, a lack of a hierarchical structure of the post of the ongoing work discussion can make it difficult to determine the relationships and responses of the post between any of the first, second, or third colleague of the professional work team. The present invention provides a system that allows any of the first, second, or third colleague of the professionals of the work team to respond to comments, portions, or segments of one or more entries of the post of the ongoing work discussion, in an input field of the parts or segment of the post, during collaborative post editing session between the any of the first, second, or third colleague of the social collaborative environment.

In the illustrated embodiment, collaborative communication system 100 includes host computing system 106, mobile computing system 112, participant computing system 114, server computing system 105 and database storage device 115. Host computing system 106, mobile computing system 112, participant computing system 114 are collaborative communication systems that operate with server computing system 105, over network 102, to facilitate collaborative splitting of one or more entries during collaborative post editing, or reviewing sessions between at least one of hosts 110, 111 or participant 113.

Host computing system 106 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Host computing system 106 comprises host program 108. Host program 108 performs necessary functions to facilitate splitting of texts of entries of social collaborative environments of collaborative communication system 100, between hosts 110, 111 or participant 113 of collaborative communication system 100.

Mobile computing system 112 can be a handheld device or handheld computer, including, for example, a personal digital assistant (PDA), or a smart phone, such as, for example, Blackberry® or iPhone®, respectively. Mobile computing system 112 includes mobile program 107. Mobile program 107 is a mobile system application that provides short message servicing (SMS), or other mobile operating system services for collaborative splitting of one or more entries during collaborative post editing sessions between hosts 110, 111, or 113 of host computing system 106, mobile computing system 112, and participant computing system 114. According to at least one embodiment, mobile program 107 also provides an operating system platform that allows any of hosts 110, 111, or participant 113 to route SMS transmissions between one or more mobile operating systems for collaborative splitting of one or more entries during collaborative post editing sessions of collaborative communication system 100. For example, the SMS transmissions can include a standardized communications protocol that allows exchange of short text messages between fixed lines, including for example, host computing system 106, mobile computing system 112, and participant computing system 114.

Participant computing system 114 can be for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Participant computing system 114 comprises participant program 109. Similarly, participant program 109 performs necessary functions to facilitate splitting of entries of social collaborative environments of collaborative communication system 100, between hosts 110, 111, or participant 113, in accordance with embodiments of the present invention.

Network 102 includes one or more networks of any kind that can provide communication links between various devices and computers connected together within collaborative communication system 100. Network 102 can also include connections, such as wired communication links, wireless communication links, or fiber optic cables. Furthermore, network 102 can be implemented as a number of different types of networks, including for example, a local area network (LAN), wide area network (WAN) or a packet switched telephone network (PSTN), or some other networked system. Network 102 can include the Internet representing a worldwide collection of networks.

Server computing system 105 can be for example, a management server, a web server, or any other electronic device or computing system capable of receiving and sending data. Server computing system 105 can also represent a "cloud" of computers interconnected by one or more networks, wherein server computing system 105 can be a primary server for a computing system that utilizes clustered computers when accessed through network 102. For example, according to at least one embodiment, a cloud computing system can implement interactive splitting of a post of collaborative communication system 100. Server computing system 105 includes server program 104. Server program 104 performs all necessary functions to split a post of collaborative communication system 100, in response to a selection of a portion of the post in host program 108, mobile program 107, or participant program 109, as described below, in accordance with embodiments of the present invention.

Database storage device 115 can be any type of storage device, storage server, storage area network, redundant array of independent discs (RAID), cloud storage device, or any type of data storage that maintains information that relates to collaborative splitting of a post or entries of a social collaborative environment during collaborative post editing sessions between at least one of hosts 110, 111 and participant 113 in collaborative communication system 100, in accordance with embodiments of the present invention. Database storage device 115 includes interactive post monitoring files 116. Interactive post monitoring files 116 includes locally available information from metadata and/or files associated with host computing system 106, mobile computing system 112, and participant computing system 114, during post editing sessions of collaborative communication system 100. Moreover, information contained in interactive post monitoring files 116 includes for example, monitored interaction of any of hosts 110, 111, or participant 113 that are engaged in the post splitting sessions of collaborative communication system 100, in accordance with embodiment of the present invention.

Figure 2:
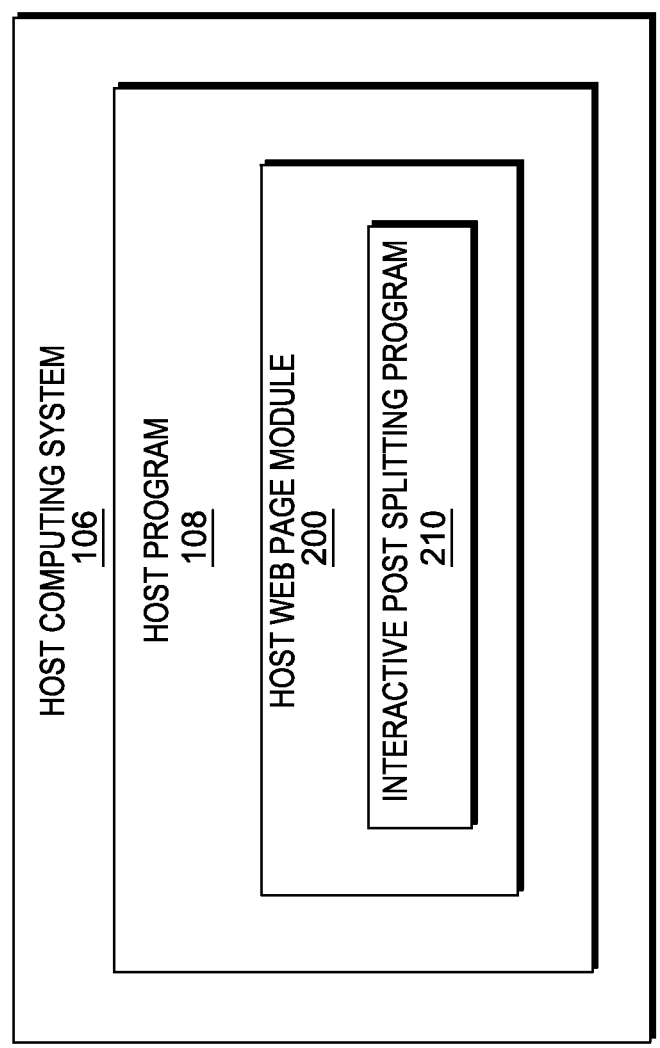
FIG. 2 is a functional block diagram illustrating program components of a host computing system in accordance with an embodiment of the present invention.

FIG. 2 is a functional block diagram illustrating program components of host computing system 106 in accordance with an embodiment of the present invention. Host program 108 can, among other things, retrieve and display content accessible via network 102, such as web pages during interactive post splitting sessions of collaborative communication system 100, in accordance with embodiments of the present invention. Host program 108 can be for example, a web server browser program. Examples of web browsers include Internet Explorer ® (Internet Explorer is a trademark of Microsoft Inc., in the United States, other countries or both), Firefox® (Firefox is a trademark of Mozilla Corporation, in the United States other countries, or both), Safari® (Safari is a trademark of Apple, Inc. in the United States, other countries, or both) and Google Chrome™ (Google Chrome is a trademark of Google, Inc. in the United States, other countries, or both), respectively.

Host program 108 includes host web page module 200. Host web page module 200 is a web browser plugin/add-on that extends the functionality of host program 108 by adding additional user interface elements to host program 108. The additional user interface elements of host program 108 allows hosts 110, 111, or participant 113 to engage in collaborative splitting of posts of collaborative communication system 100, during collaborative post editing sessions between hosts 110, 111, or participant 113 of host computing system 106, mobile computing system 112, and participant computing system 114, in accordance with embodiments of the present invention. For example, host program 108 includes a collaborative post editing web page that is received from server program 104. The collaborative post editing web page of host program 108, can include for example, program code, such as Hyper-Text Markup Language (HTML) code or JavaScript code that, when executed, adds one or more user interface elements to host program 108. According to at least one embodiment, sever program 104 utilizes host program 108 to monitor interactive splitting of a post of host program 108 by any of hosts 110, 111, or participant 113, engaged in an interactive splitting of posts during collaborative post editing sessions of collaborative communication system 100. Host web page module 200 includes interactive post splitting program 210. Interactive post splitting program 210 is a web browser plugin/add-on that extends the functionality of host web page module 200 by adding additional user interface elements to a user interface of host web page module 200. According to at least one embodiment, the additional user interface elements of interactive post splitting program 210 allows any of host 110, 111, or participant 113 to engage in interactive splitting of a post of collaborative messaging system 100, based on program instructions of server program 104 to split the post of collaborative system 100, in response to selection of a portion of the post by host 110, 111, or participant 113 in interactive post split program 210, at a location of at least one of a boundary of the selection, or within the selection of the post of interactive post splitting program 210, in accordance with embodiments of the present invention.

For example, interactive post splitting program 210 monitors and split the post of collaborative system 100 based on interaction of any of host 110, 111, or participant 113, engaged in the post splitting session of collaborative communication system 100, wherein monitoring of the post by interactive post split program 210 occurs periodically, randomly, and/or using event-based monitoring of program actions to split the post of interactive post splitting program 210, during collaborative post editing sessions of collaborative communication system 100.

According to at least one embodiment, server program 104 presents an input box for display in interactive post splitting program 210, wherein the input box is configured to receive a response to the post, as described in further details below. For example, the presentation of the input box occurs in a space defined between segments of interactive post splitting program 210. Server program 104 further transmits program instructions to interactive post splitting program 210 to allow insertion of the response in the space defined between the segments of the post of interactive post splitting program 210, as described below, in accordance with at least one embodiment of the present invention.

FIG. 3A is an exemplary view of user interface elements added to a user interface of interactive post splitting program 210, in accordance with embodiments of the present invention. Interactive post splitting program 210 includes one or more of the following user interface elements: requestor ID 310, message response window 314, and cursor 312. Requestor ID 310 provides an identifier of at least one user, including for example, hosts 110, 111, or participant 113, engaged interactive splitting of a post of during a collaborative post editing sessions of collaborative communication system 100.

Requestor ID 310 includes for example, a name of an image, or other display of remotely located hosts 110, 111, or participant 113 of host computing system 106, mobile computing system 112, and participant computing system 114, engaged in the splitting of post of interactive post split program 210. For example, the image or other displays of requestor ID 310 can include, a name of any of hosts 110, 111, or participant 113, an icon that represents any of hosts 110, 111, or participant 113, or other graphical representation of any of hosts 110, 111, or participant 113. Interactive post splitting program 210 can also include an additional host 110, 111, or participant 113 selection section. According to at least one embodiment, the additional host 110, 111, or participant 113 selection section can be utilized by any of hosts 110, 111, or participant 113 to select at least one or more hosts 110, 111, or participant 113 to engage in interactive post splitting sessions, or utilize additional user interface elements of interactive post splitting program 210 to engage in interactive splitting of posts of collaborative communication system 100.

Message response window 314 represents collaborative conversation history between hosts 110, 111, or participant 113 during post splitting session of collaborative communication system. For example, message response window 314 is a window editor or a message window, through which hosts 110, 111, or participant 113 can reply to posts of collaborative communication system 100. Message response window 314 also contains, for example, a transcript of posts of collaborative communication system 100. In the depicted embodiment, in response to a selection of post of message response window 314 by any hosts 110, 111, or participant 113, wherein requestor utilizes cursor 312 at a point where the requestor's response will be inserted in the post of message response window 314, interactive post split program 210 splits the post at a location of a boundary of the selection of the post into segments, including for example, a first segment and a second segment of interactive post split program 210, as described in FIG. 3B. For example, interactive post split program 210 monitors activities of cursor 312 to split the post at the location of the boundary of the selection or within the selection into a first segment or a second segment of the post.

Interactive post split program 210 transmits the monitored and split post of interactive post split program 210 to interactive post monitoring files 116 for retrieval by server program 104. Server program 104 further transmits program instructions to interactive post splitting program 210 to allow insertion of the response in the space defined between the segments of the post, based on the monitored information of interactive post split program 210. For example, consider that hosts 110, 111, or participant 113 are engaged in a collaborative messaging session of a post of interactive post split program 210. Also, consider that instead of responding to the entire post of conversation window, any of hosts 110, 111, or participant 113 decides to response to specific portions of the post, or to a specific issue or topic of the post. In this manner, any of hosts 110, 111, or participant 113 utilizes cursor 312 at a point where response to hosts 110, 111, or participant 113 will be inserted in the post of conversation window 314. Further, if any of hosts 110, 111, or participant 113 selects the specific portion of the post to respond to, interactive post split program 210 detects a character of the position of the post relative to the beginning of the text of message response window 314, and inserts a mark, or delimiter in the HTML source, whose ID will be linked to corresponding reply of the post, in accordance with embodiments of the present invention. According to at least one embodiment, selection of the specific portion of the post by utilization of cursor 312 is triggered by selection of at least one text or at least one image of the post of interactive post splitting program 210.

Figure 3B:
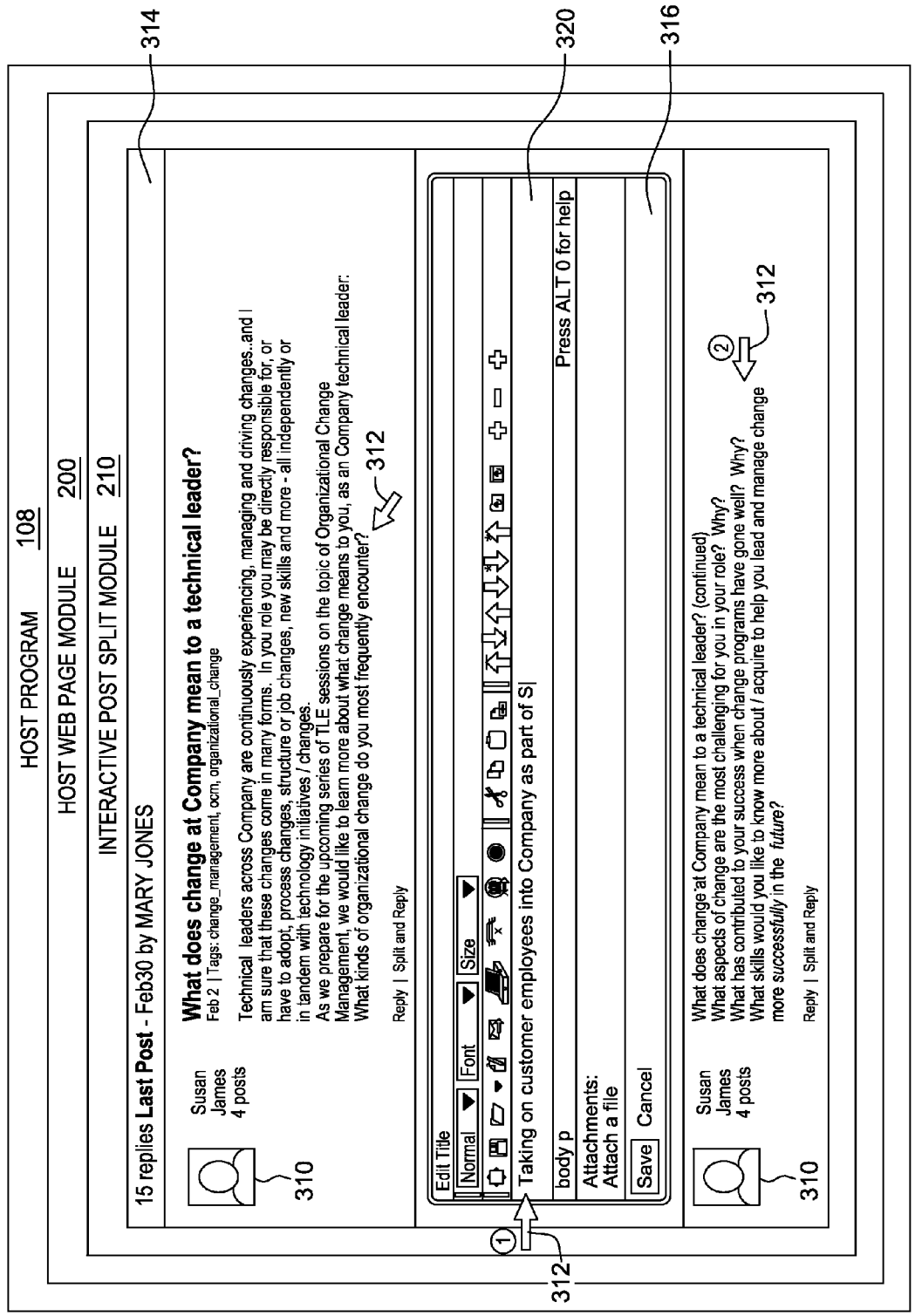

FIG. 3B is exemplary view of user interface elements added to a user interface of interactive post splitting program 210 for interactive splitting of a post of collaborative communication system 100, wherein segment window 316 allows any of hosts 110, 111, or participant 113 to respond to specific portions of the post, in accordance with embodiments of the present invention.

As depicted, after any of hosts 110, 111, or participant 113 selects specific portions of post of conversation window 314 in response to in interactive post splitting program 210, interactive post splitting program 210 splits the post, in response conversation window 314, wherein interactive post splitting program 210 utilizes cursor 312 to respond to specific portions of the selected post. According to at least one embodiment, segment window 316 is separated by one or more reply segments that allows hosts 110, 111, or participant 113 to respond to the post of interactive post splitting program 210, in a way that allows additional hosts or responders of interactive post split program 210 to engage in interactive splitting of posts of collaborative communication system 100. Moreover, segment window 316 includes input box 320. Input box 320 allows hosts 110, 111, or participant 113, to respond to specific portions of the post. Input box 320 is presented in a user interface of interactive post split program 210 based on selection of the portion of the post by any of hosts 110, 111, or participant 113 to split the post at a location of at least one or a boundary of the selection or within the selection, into segments, including for example, segment window 316 in message conversation window 314. As depicted, hosts 110, 111, or participant 113 can insert the response to the post between the segments of input box 320, in accordance with embodiments of the present invention.

FIG. 3C is an exemplary view of exemplary view of user interface elements added to a user interface of interactive post splitting program 210 for interactive splitting of a post of collaborative communication system 100, wherein replies to the post by any of hosts 110, 111, or participant 113 is presented in various views in interactive post splitting program 210, in accordance with embodiments of the present invention.

According to at least one embodiment, in order to control excessive splitting of the post by any of hosts 110, 111, or participant 113 in interactive post split program 210, interactive post splitting program 210 includes view option 410 for viewing post of interactive splitting program 210 in various visualization modes, wherein view option 410 can provide any of classic and hierarchical views of the post, and also, wherein the views can be grouped according to historical or current post of interactive split program 210 by any of the hosts 110, 111, or participant 113. Moreover, in the depicted embodiment, any of the hosts 110, 111, or participant 113 can utilize edit options to identify specific questions replied in interactive post split program 210.

Figure 4:
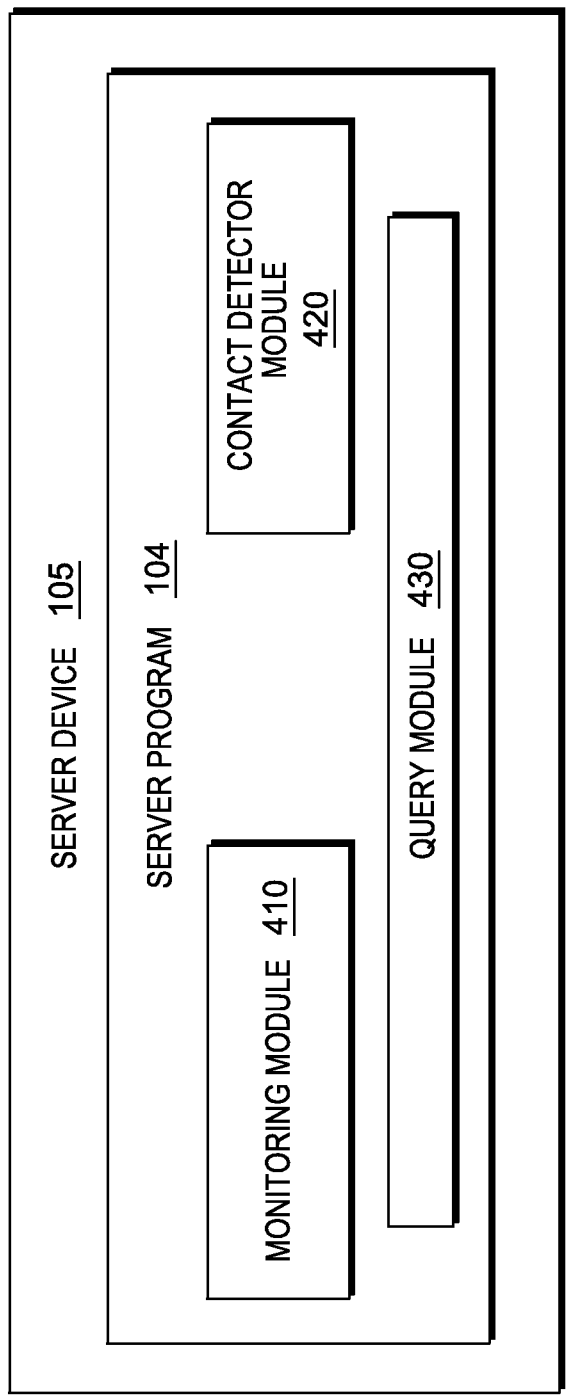
FIG. 4 is a functional block diagram illustrating program components of a server computing system in accordance with an embodiment of the present invention.

FIG. 4 is a functional block diagram illustrating program components of server computing device 105 in accordance with embodiments of the present invention. According to at least one embodiment, server program 104 performs all necessary functions to split a post of collaborative communication system 100 in response to a selection of a portion of the post by any of hosts 110, 111, or participant 113, engaged in collaborative post splitting sessions of collaborative communication system 100, wherein any of the hosts 110, 111, or participant 113 responses or replies to at least one portion of the post during post editing sessions of collaborative communication system 100.

Server program 104 includes monitoring module 410, content detector module 420, and query module 430. Monitoring module 410 monitors interaction of any of hosts 110, 111, or participant 113 engaged in the post splitting session in interactive post split program 210 of collaborative communication system 100, wherein the monitoring is conducted periodically, randomly, and/or using event-based monitoring of actions by any of hosts 110, 111, or participant 113 to split the post. Monitoring module 410 also dynamically monitors collaborative editing of posts or messages transmitted in interactive post split program 210. Monitoring module 410 can also retrieve monitored information of interactive post split program 210 from interactive post monitoring files 116 of FIG. 1, in accordance with embodiments of the present invention.

According to at least one embodiment, content detector module 420 monitors utilization of cursor 312 by any of hosts 110, 111, or participant 113 to split the post of interactive post split program 210 at the location of at least one boundary of the selection or within the selection of the post of interactive post split program 210. For example, content detector module 420 dynamically detects activities of cursor 312 to split the post at the location of at least one boundary of the selection periodically, randomly, and/or using event-based detection of actions by any of hosts 110, 111, or participant 113 to split portion of a post of interactive post split program 210. For example, content detector module 420 detects utilization of cursor 312 interactive post split program 210 based on triggered selection of at least one text or at least one image of the post of interactive post split program 210.

Query module 430 analyzes the monitored interaction of interactive post split program 210 and content detector module 420, and dynamically presents input box 320, which is configured to receive a response to the post of interactive post split program 210, based on the analyzed monitored interaction of content detector module 420. For example, according to at least one embodiment, query module 430 utilizes application programming interface (API) or other database-specific semantics, including for example, structured query language (SQL) commands to communicate with monitoring module 410 and content detector module 420 to present input box 320 in interactive post split program 210. For example, query module 430 further allows insertion of the response in the space defined between segments of the selected post of interactive post split program 210, during post splitting session of collaborative communication system 100. Query module 430 can also store the monitored interaction of monitoring module 410 and content detector module 420 in interactive monitoring files 116 for future retrieval and processing of interactive splitting of post of interactive post split program 210, during post editing sessions between any of hosts 110, 111, and participant 113.

Figure 5:
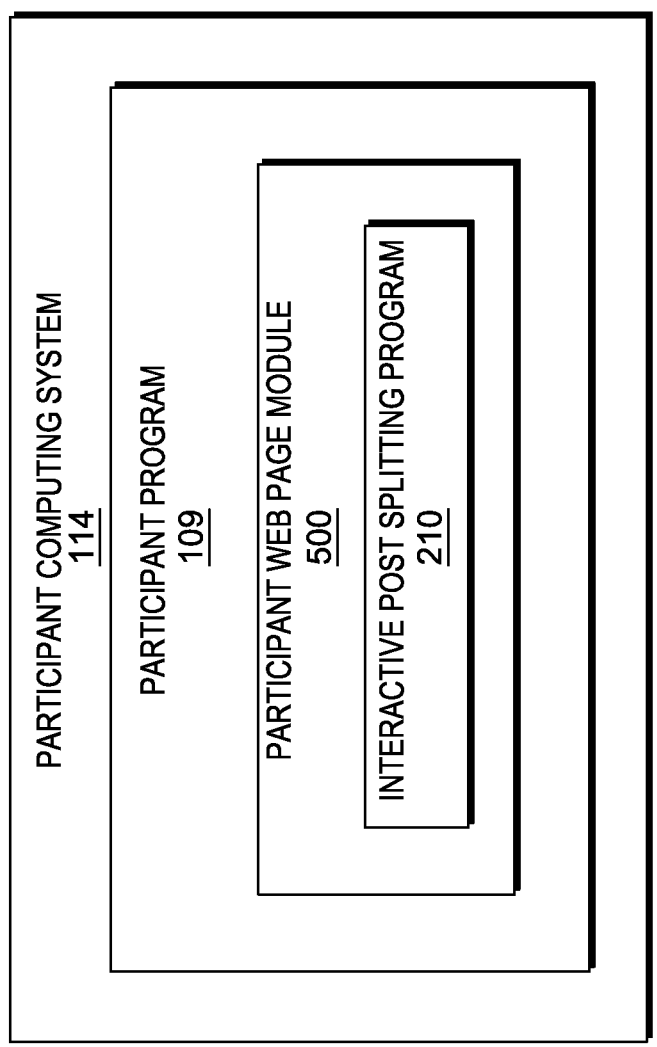
FIG. 5 is a functional block diagram illustrating program components of a participant computing system in accordance with an embodiment of the present invention.

FIG. 5 is a functional block diagram illustrating components of participant computing system 114, in accordance with an embodiment of the present invention. Participant computing system 114 includes participant program 109. Participant program 109 can, among other things, retrieve and display content accessible via network 102 for facilitating splitting of texts of entries of social collaborative environments of collaborative communication system 100, between hosts 110, 111, or participant 113. Participant program 109 can be a web browser. Participant program 109 includes participant web page module 500. Participant web page module 500 is a web browser plugin/add-on that extends the functionality of participant program 109 by adding additional user interface elements to a user interface of participant program 109. The additional user interface of participant web page module 500 allows transmission of information by server program 104 for facilitation of splitting of texts of entries of social collaborative environments of collaborative communication system 100, between hosts 110, 111, or participant 113. Similarly, participant web page module 500 includes interactive post splitting program 210. As described, interactive post splitting program 210 monitors interaction of any of host 110, 111, or participant 113, engaged in the post splitting session of collaborative system, periodically, randomly, and/or using event-based monitoring of program actions to split the post of interactive post splitting program 210, during collaborative post editing sessions of collaborative communication system 100.

Figure 6:
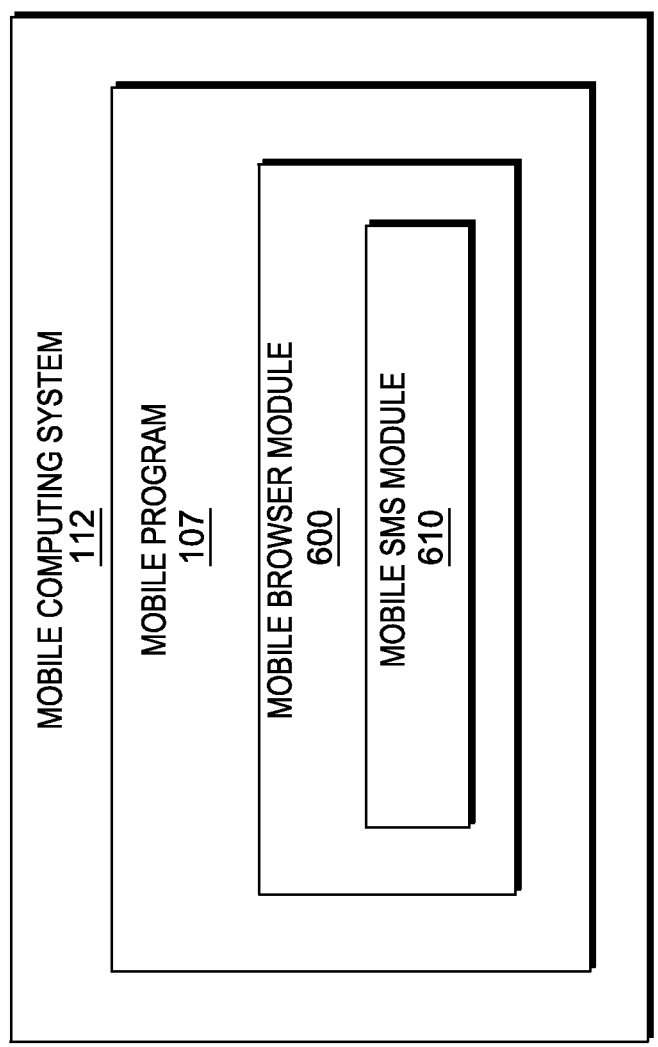
FIG. 6 is a functional block diagram illustrating program components of a mobile computing system in accordance with an embodiment of the present invention.

FIG. 6 is a functional block diagram illustrating components of mobile computing device 112, in accordance with an embodiment of the present invention. Mobile computing device 112 comprises mobile program 107. As described, mobile program 107 provides an operating system platform that allows any of hosts 110, 111, or participant 113 to route SMS transmissions between one or more module computing systems for collaborative splitting of one or more entries during collaborative post editing sessions of collaborative communication system 100. For example, mobile program 107 can, among other things, retrieve and display content accessible via network 102, such as web pages, for interactive splitting of posts by any of hosts 110, 111, or participant 113 of collaborative communication system 100.

Mobile program 107 comprises mobile browser module 600. Mobile browser module 600 is a web browser plugin/add-on that extends the functionality of mobile program 107 by adding additional user interface elements to a user interface of mobile browser module 600. The additional user interface of mobile browser module 600 allows transmission of information by server computing system 105 for facilitation of splitting of texts of entries of social collaborative environments of collaborative communication system 100 between hosts 110, 111, or participant 113. Mobile browser module 600 comprises mobile SMS module 610. Mobile SMS module 610 provides an operating system platform for transmission of SMS message between host computing system 106, mobile computing device 112, and participant computing system 114, for collaborative splitting of one or more entries during collaborative post editing sessions of collaborative communication system 100. The SMS transmissions include a standardized communications protocol that allows exchange of short text messages for collaborative splitting of post of collaborative communication system 100.

Figure 7:
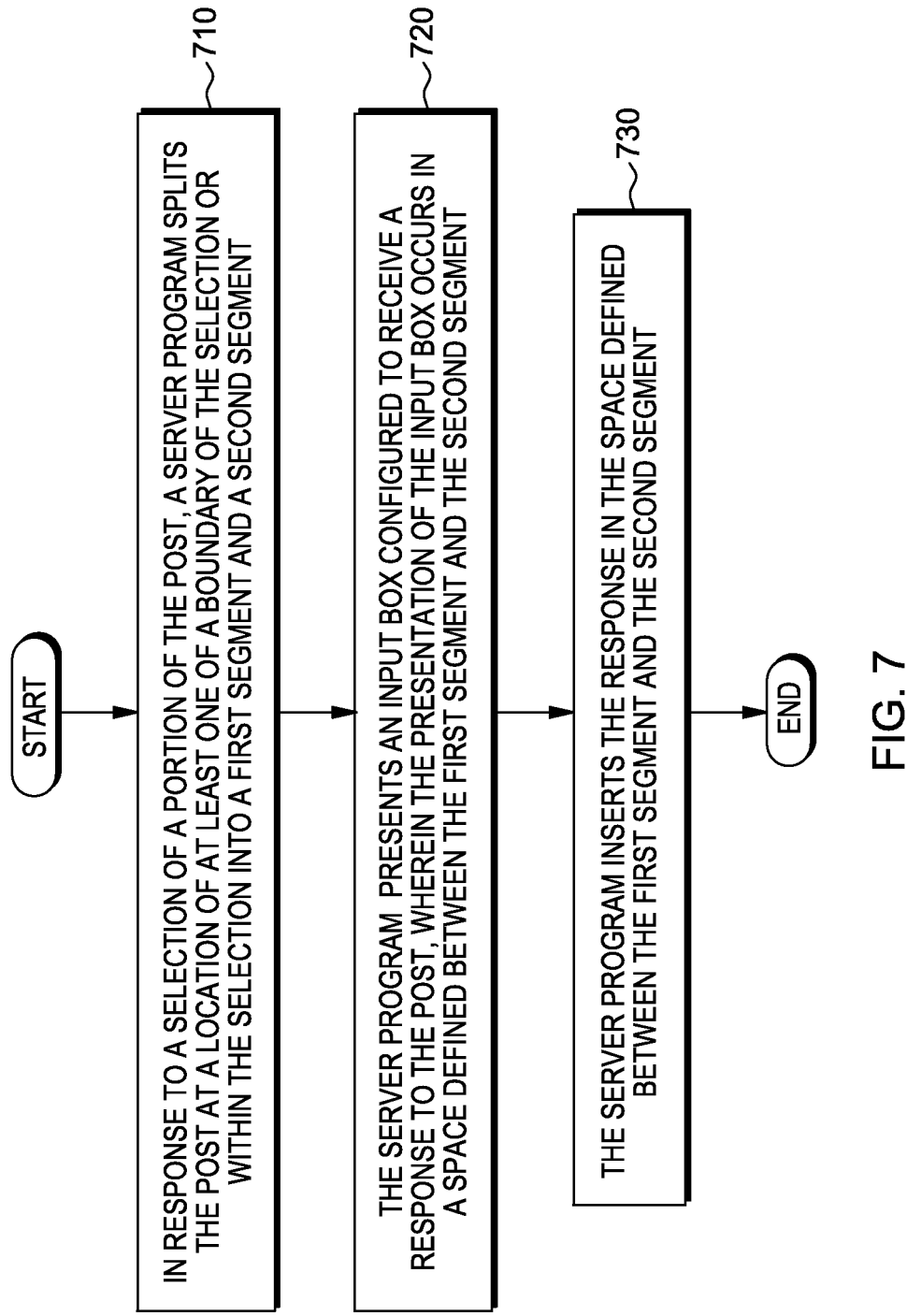
FIG. 7 is a flow diagram depicting steps performed by a server program for interactive splitting of a post of a social collaborative environment of the collaborative communication system in accordance with embodiments of the present invention.

FIG. 7 is a flow diagram depicting steps performed by server program for performing interactive splitting of a post of collaborative communication system 100 in accordance with one embodiment of the present invention. According to at least one embodiment, in response to a selection of a portion by any of hosts 110, 111 or participant 113 in interactive post split program 210, server program 104 splits the post of interactive post split program 210 at a location of at least one boundary of the selection or within the selection into segments of interactive post split program 210 (Step 710). For example, any of hosts 110, 111 or participant 113 can utilize cursor 312 to split the post a the location of at least one boundary of the selection or within the selection into the first segment and the second segment, wherein, server program 104 detects activities of the cursor to split the post at the location of at least one boundary of the selection or within the selection into the first segment and the second segment of segment window 316 in interactive post split program 210.

In one example, consider that of any of hosts 110, 111 or participant 113 publishes a series of questions or inquires relating to an ongoing work project in interactive post split program 210. Server program 104 allows any of hosts 110, 111 or participant 113 to respond to specific issues, topics, or segments of the post by allowing any of hosts 110, 111 or participant 113 to split the series of questions or inquiries of the post at a location of at least one boundary of the selection or within the selection of the post into segments of interactive post split program 210.

In another example, consider that a first user of any of hosts 110, 111 or participant 113 discusses system malfunctions of a work computing system in a post of interactive post split program 210. Moreover, in the same post, any of hosts 110, 111 or participant 113, discusses multiple topics relating to system malfunctions of the work computing system. Now, consider that a second user of any of hosts 110, 111 or participant 113 provides specific answers to repair malfunctioned work computing system, and also, a third user of any of hosts 110, 111 or participant 113 also provides additional specific answers to assist in repairing the malfunctioned work computing system. According to at least one embodiment, in response to a selection of a portion of specific topics of post of the malfunctioned work computing system by the first user or the second user of any of hosts 110, 111 or participant 113 in interactive post split program 210, server program 104 splits the post of interactive post split program 210 at a location of at least one boundary of the selection or within the selection into segments of interactive post split program 210, wherein the split allows the first user or the second user of any of hosts 110, 111 or participant 113 to respond or provide answers to specific topics of the malfunctioned work computing system.

Sever program 104 presents input box 320 configured to receive a response to the post, wherein the presentation of input box 320 occurs in a space defined between segments of interactive post split program 210 (Step 720). For example, sever program 104 dynamically enters post splitting mode in response to a selection of a portion of the post by any of hosts 110, 111 or participant 113 in interactive post split program 210. According to at least one embodiment, while split mode, the post is split and converted in two segments that allows any of hosts 110, 111 or participant 113 to respond to the segments of the post. Server program 104 further inserts the response in the space defined between a first and a second segment window 316 (Step 730). Moreover, in response to another selection of another portion of the post by any of hosts 110, 111 or participant 113, server program 104 includes a reply to the response of the post in a space defined between the first segment and the second segment of segment window 316 of interactive post split program 210. For example, the selection point of the other selection of the other portion of the post is one of the first segment, the second segment or in the reply to the response of the post. Server program 104 further determines whether a predetermined amount of splitting of the portion of the post in interactive post split program 210 is reached. If a predetermined amount of splitting of the portion of the post is reached, server program 104 prevents splitting of the post based on the determination that the predetermined amount of the splitting of the portion of the post is reached.

Figure 8:
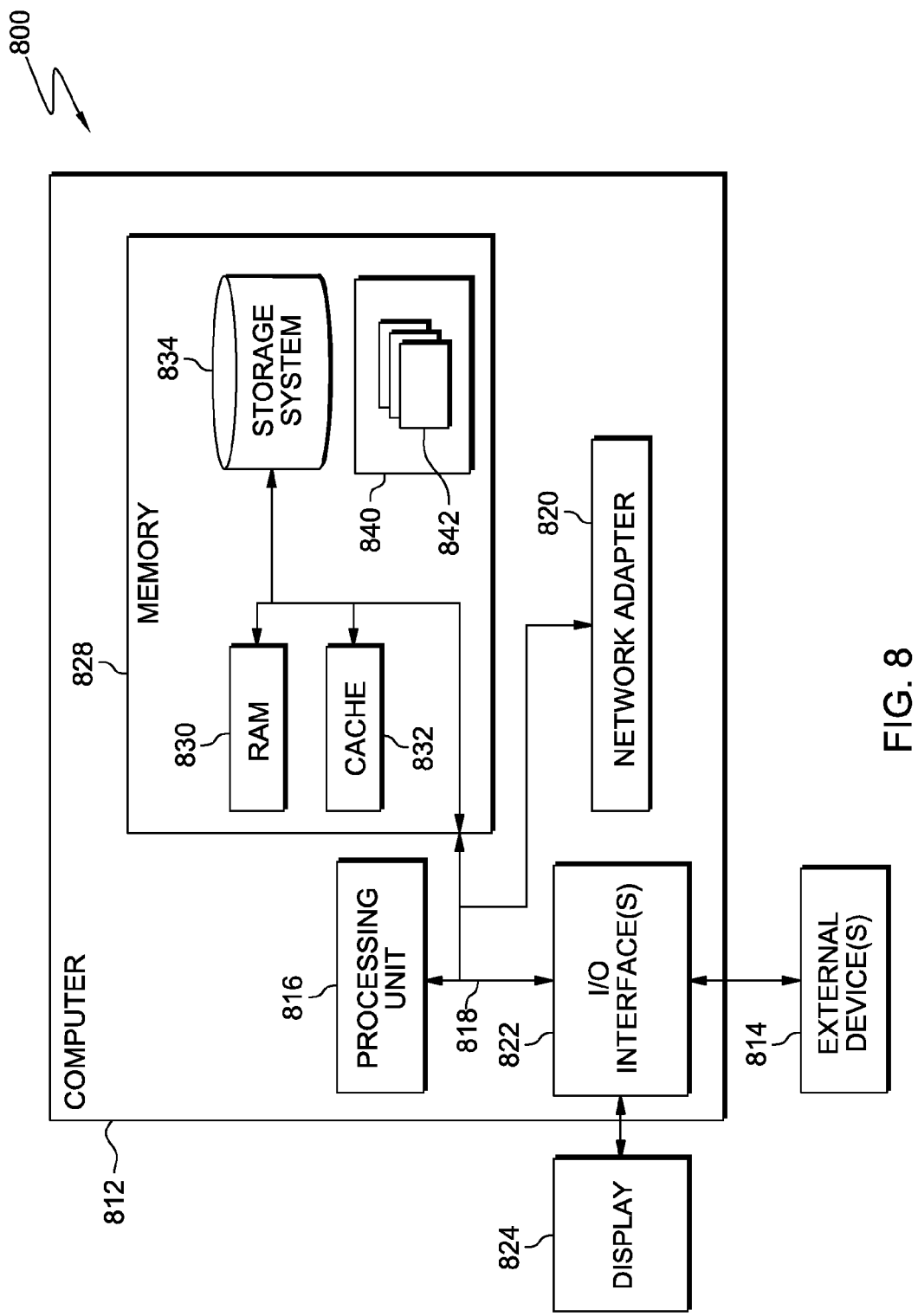
FIG. 8 illustrates a block diagram of components of a computer system in accordance with embodiments of the present invention.

FIG. 8 is a block diagram of a computer system, in accordance with an embodiment of the present invention.

Computer system 800 is only one example of a suitable computer system and is not intended to suggest any limitation as to the scope of use or functionality of embodiments of the invention described herein. Regardless, computer system 800 is capable of being implemented and/or performing any of the functionality set forth hereinabove. In computer system 800 there is computer 812, which is operational with numerous other general purpose or special purpose computing system environments or configurations. Examples of well-known computing systems, environments, and/or configurations that may be suitable for use with computer 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Host computing system 106, mobile computing system 112, participant computing system 114, and server computing system 105 can be implemented as an instance of computer 812.

Computer 812 may be described in the general context of computer system executable instructions, such as program modules, being executed by a computer system. Generally, program modules may include routines, programs, objects, components, logic, data structures, and so on that perform particular tasks or implement particular abstract data types. Computer 812 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 8, computer 812 is shown in the form of a general-purpose computing device. The components of computer 812 may include, but are not limited to, one or more processors or processing unit 816, memory 828, and bus 818 that couples various system components including memory 828 to processing unit 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 812 typically includes a variety of computer system readable media. Such media may be any available media that is accessible by computer 812, and includes both volatile and non-volatile media, and removable and non-removable media.

Memory 828 includes computer system readable media in the form of volatile memory, such as random access memory (RAM) 830 and/or cache 832. Computer 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Host program 108, mobile program 107, participant program 109 and server program 104 can be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein. Host program 108, mobile program 107 participant program 109 and server program 104 can be implemented as an instance of program 840.

Computer 812 may also communicate with one or more external devices 814 such as a keyboard, a pointing device, etc., as well as display 824; one or more devices that enable a user to interact with computer 812; and/or any devices (e.g., network card, modem, etc.) that enable computer 812 to communicate with one or more other computing devices. Such communication occurs via Input/Output (I/O) interfaces 822. Still yet, computer 812 communicates with one or more networks such as a local area network (LAN), a general wide area network (WAN), and/or a public network (e.g., the Internet) via network adapter 820. As depicted, network adapter 820 communicates with the other components of computer 812 via bus 818. It should be understood that although not shown, other hardware and/or software components could be used in conjunction with computer 812. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method for interactive splitting of a post of a social collaborative environment have been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer-implemented method for interactive splitting of a post of a social collaborative environment, the computer-implemented method comprising the steps of:
   in response to a selection of a portion of the post, splitting, by one or more processors, the post at a location of at least one of a boundary of the selection or within the selection into a first segment and a second segment;
   presenting, by the one or more processors, an input box configured to receive a response to the post, wherein the presentation of the input box occurs in a space defined between the first segment and the second segment;
   inserting, by the one or more processors, the response in the space defined between the first segment and the second segment; and
   in response to another selection of another portion of the post, including, by the one or more processors, a reply to the response of the post in the space defined between the at least one of the first segment and the second segment.

2. The computer-implemented method according to claim 1, wherein a selection point of the other selection of the other portion of the post is one of the first segment, the second segment, or in the reply to the response of the post.

3. The computer-implemented method according to claim 1, wherein the selection of the portion of the post is performed by at least one user of the post.

4. The computer-implemented method according to claim 1, wherein the step of in response to a selection of a portion of the post, splitting, by one or more processors, the post at a location of at least one of a boundary of the selection or within the selection into a first segment and a second segment, further includes the steps of:
   determining, by the one or more processors, whether a predetermined amount of splitting of the portion of the post is reached; and
   preventing, by the one or more processors, splitting of the post based on a determination that the predetermined amount of splitting of the portion of the post is reached.

5. The computer-implemented method according to claim 1, further including the steps of:
   utilizing, by the one or more processors, a tool to split the post at the location of at least one of the boundary of the selection or within the selection into the first segment and the second segment; and
   detecting, by the one or more processors, activities of the tool to split the post at the location of at least one of the boundary of the selection or within the selection into the first segment and the second segment.

6. The computer-implemented method of claim 5, wherein the step of utilizing, by the one or more processors, a tool to split the post at the location of at least one of the boundary of the selection or within the selection into the first segment and the second segment is triggered by selection of at least one text or at least one image of the post.

7. A computing system for interactive splitting of a post of a social collaborative environment, the computing system comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
      in response to a selection of the post, program instructions to split the post at a location of at least one of a boundary of the selection or within the selection into a first segment and a second segment;
      program instructions to present an input box configured to receive a response to the post, wherein the presentation of the input box occurs in a space defined between the first segment and the second segment;
      program instructions to insert the response in the space defined between the first segment and the second segment; and
      program instructions to include a reply to the response of the post in the space defined between the first segment and the second segment in response to another selection of another portion of the post.

8. The computer system according to claim 7, wherein a selection point of the other selection of the other portion of the post is one of the first segment, the second segment, or in the reply to the response of the post.

9. The computer system according to claim 7, wherein the selection of the portion of the post is performed by at least one user of the post.

10. The computer system according to claim 7, wherein program instructions to split the post at a location of at least one of a boundary of the selection or within the selection into a first segment and a second segment in response to a selection of a portion of the post, further includes:
    program instructions to determine whether a predetermined amount of splitting of the portion of the post is reached; and
    program instructions to prevent splitting of the post based on a determination that the predetermined amount of splitting of the portion of the post is reached.

11. The computer system according to claim 7, further including:
    program instructions to utilize a tool to split the post at the location of at least one of the boundary of the selection or within the selection into the first segment and the second segment; and
    program instructions to detect activities of the tool to split the post at the location of at least one of the boundary of the selection or within the selection into the first segment and the second segment.

12. The computer system according to claim 11, wherein program instructions to utilize a tool to split the post at the location of at least one of the boundary of the selection or within the selection into the first segment and the second segment is triggered by selection of at least one text or at least one image of the post.

13. A computer program product for interactive splitting of a post of a social collaborative environment, the computer program product comprising: one or more non-transitory computer-readable storage media and program instructions stored on the one or more non-transitory computer-readable storage media, the program instructions comprising:
    in response to a selection of the post, program instructions to split the post at a location of at least one of a boundary of the selection or within the selection into a first segment and a second segment;
    program instructions to present an input box configured to receive a response to the post, wherein the presentation of the input box occurs in a space defined between the first segment and the second segment;

program instructions to insert the response in the space defined between the first segment and the second segment; and program instructions to include a reply to the response of the post in the space defined between the first segment and the second segment in response to another selection of another portion of the post.

14. The computer program product according to claim 13, wherein a selection point of the other selection of the other portion of the post is one of the first segment, the second segment, or in the reply to the response of the post.

15. The computer program product according to claim 13, wherein the selection of the portion of the post is performed by at least one user of the post.

16. The computer program product according to claim 13, wherein program instructions to split the post at a location of at least one of a boundary of the selection or within the selection into a first segment and a second segment in response to a selection of a portion of the post, further includes:

program instructions to determine whether a predetermined amount of splitting of the portion of the post is reached; and program instructions to prevent splitting of the post based on a determination that the predetermined amount of splitting of the portion of the post is reached.

17. The computer program product according to claim 13, further including:

program instructions to utilize a tool to split the post at the location of at least one of the boundary of the selection or within the selection into the first segment and the second segment; and program instructions to detect activities of the tool to split the post at the location of at least one of the boundary of the selection or within the selection into the first segment and the second segment.

\* \* \* \* \*